July 21, 1959
E. M. PIERCE
2,895,702
THERMOS JUG HOLDER
Filed Sept. 18, 1956
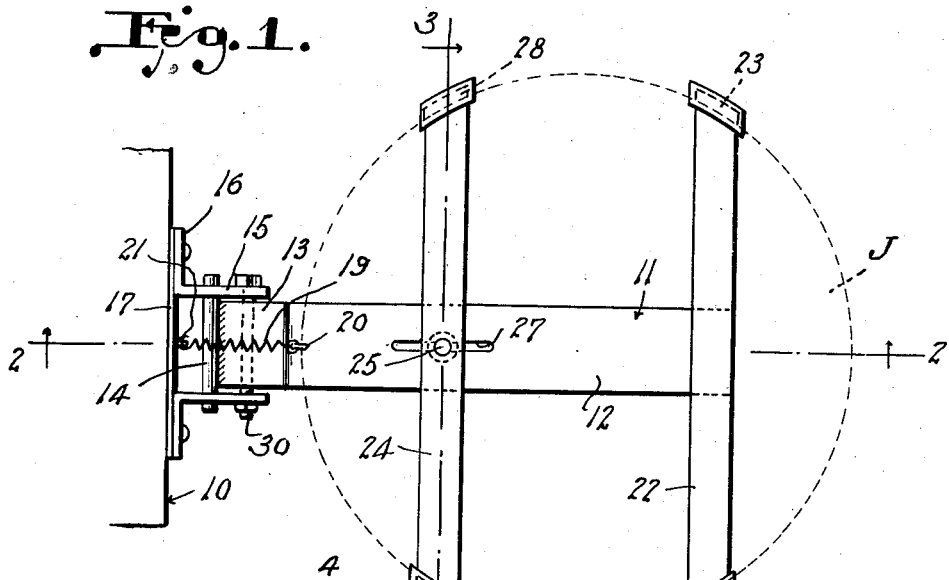
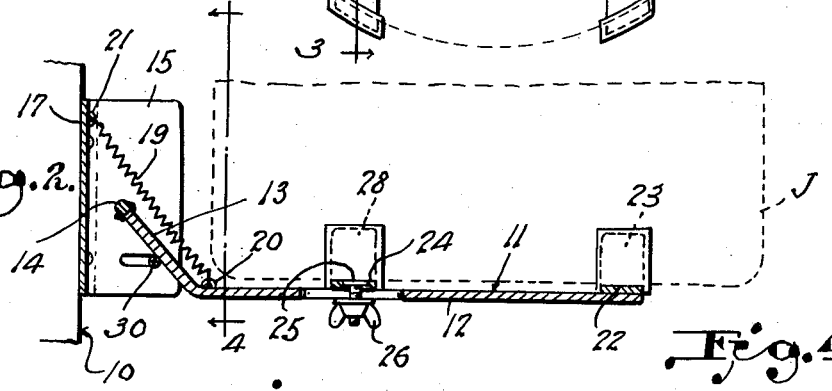
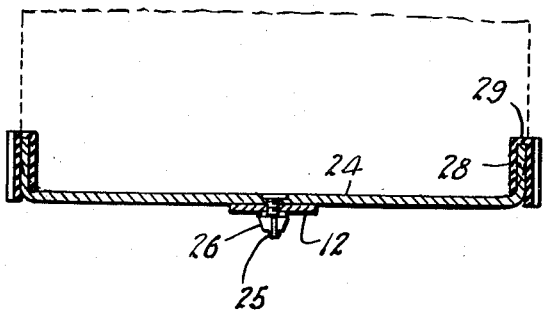
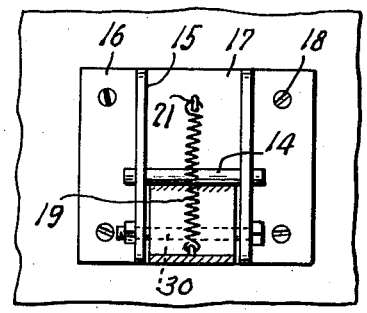
Eldridge M. Pierce
INVENTOR
BY *CA Snow & Co.*
ATTORNEYS.

United States Patent Office 2,895,702
Patented July 21, 1959

2,895,702

THERMOS JUG HOLDER

Eldridge M. Pierce, North Highlands, Calif.

Application September 18, 1956, Serial No. 610,484

1 Claim. (Cl. 248—293)

This invention relates to a Thermos jug holder.

In a motor vehicle, truck, bus or the like, it is frequently the practice to take along a Thermos jug full of cold or hot liquid. Most of such jugs have a spigot for discharge of liquid into a glass or cup. Inasmuch as these jugs are quite large and quite heavy when full, it is sometimes quite awkwaard to remove any liquid from the jug. It is, therefore, an object of this invention to provide a jug holder or bracket which may be mounted in a convenient location so as to support a Thermos jug, whereby the contents of the jug may be selectively drained through the spigot.

Another object of this invention is to provide a supporting bracket having a jug supporting arm which is spring-pressed to inoperative position, so that when the bracket is not in use the supporting arm will be swung to an out-of-the-way position.

A further object of this invention is to provide a supporting bracket having adjustable means for maintaining the supporting arm horizontal regardless of the angle of the base, and the supporting arm includes upwardly projecting lugs which are covered with rubber caps so that the jug may be tightly clamped to the arm.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawing:

Figure 1 is a plan view of a Thermos jug holder constructed according to an embodiment of this invention.

Fig. 2 is a vertical section taken on line 2—2 of Fig. 1.

Fig. 3 is a transverse section taken on line 3—3 of Fig. 1.

Fig. 4 is a transverse section taken on line 4—4 of Fig. 2.

Referring to the drawing, the numeral 10 designates generally a supporting element which may be a portion of a vehicle, truck or other mobile element. The character J designates generally a Thermos jug which is of the conventional type including a spigot whereby the liquid contents may be removed from the jug.

In order to provide a means whereby the jug J may be firmly and conveniently supported from the supporting member 10 I have provided a bracket generally indicated at 11. The bracket 11 is formed of an elongated horizontal bar 12 which is provided at its inner end with an upwardly projecting obtusely inclined inner end or portion 13. The inner end 13 has a pivot pin 14 fixed as by welding thereto and the pin 14 projects through the outwardly extending ears 15 of angle members which have right-angled base bars 16. The base bars 16 are secured to a backing plate 17 which may be fastened as by securing members 18 to the support or wall 10.

The bar 12 is constantly urged upwardly to an inoperative position by means of a spring 19 which is secured at one end as at 20 to the inner or rear end of the bars 12. The opposite end of the spring 19 is secured as at 21 to an eye carried by the backing plate 17 between the ears 15.

The outer end of the wall 12 has secured thereto a right-angularly disposed bar 22 which is formed at the outer end thereof with upwardly projecting lugs 23. Lugs 23 are adapted to engage the bottom portion of the jug J so as to provide a seat with the bar 22 for the bottom of the jug. An adjustable bar 24 extends right angularly with respect to bar 12 and engages on the upper side thereof. A clamping bolt 25 having a wing nut 26 threaded thereon extends through the bar 24 and the bar 12 is provided with an elongated slot 27 through which the bolt 25 engages. The bar 24 may be adjusted lengthwise of the bar 12 to engage tightly against the lower portion of the jug J and cooperate with the lugs 23 in firmly securing the jug to the bracket. The bar 24 has projecting upwardly from the opposite ends thereof lugs 28 which are similar to lugs 23 and engage the outer sides of the jug J adjacent the bottom thereof.

In order to provide a means whereby the jug may be frictionally and more tightly secured between the lugs 23 and 28, these lugs are provided with rubber caps 29 which telescope over the lugs 23 and 28 and which are adapted to firmly bear against the outer side of the jug J.

The bracket structure embodying bars 12, 22 and 24, are adapted to be angularly adjusted with respect to the back member 17 and the supporting ears 15 by means of a stop bolt 30, which engages through elongated slots 31 formed in the ears 15. The bolt 30 is adapted to engage the lower side of the obtusely angled bar member 13, as shown in Fig. 2 so that the outer bar or arm 12 may be in a substantially horizontal position.

In the use of this jug supporting means the bracket is secured to the desired support 10 and this support may be either a vertical support, such as the forward wall of a vehicle body which is positioned beneath dashboard, or the support 10 may be in the other wall or fixed element which may be either in a vertical or an inclined position. When the back member 17 with the ears 15, is secured to the support 10, the stop bore 30 is adjusted in the slots 31 of the ears 15 so that the bar 12 with the bars 22 and 24 may be in a substantially horizontal position. The adjustable bar 24 is adjusted lengthwise of the slot 27 in bar 12 so that the inner or rear clamping lugs 28 with the caps 29 thereon may tightly engage a lower portion of the jug J. The liquids may then be conveniently taken from the jug J by opening of the spigot. This bracket structure will eliminate the handling of a jug by a passenger or driver of the vehicle and will provide a means whereby hot or cold liquids may be conveniently supported within the vehicle.

What is claimed is:

A jug holder comprising a base plate, a pair of angle members fixed to said plate in spaced parallel relation, one side of each angle member projecting right-angularly from said plate, an elongated bar having an obtuse angled end therein adjacent the edges of said angle members, means engaging through the projecting sides of said angle members and fixed to the inner end of said bar pivotally securing said elongated bar at an intermediate point between said angle members said projecting sides of said angle members having elongated parallel slots therein adjacent and below said means for pivotally securing said one end of said elongated bar, a stop bolt extended through said slots engageable with the under side of said obtusely angled end of said elongated bar, a nut for adjustably securing said bolt to adjustably limit the downward movement of said elongated bar, a transverse bar fixed to said first named bar adjacent the forward end of the latter, an upstanding lug at each end of said transverse bar engageable on the outer side of the jug, said lugs having arcuate inner sides to conform to the curvature of said jug, a longitudinal slot in said elongated bar, a second transverse bar, a pin engaging through said slot for adjustably securing said second transverse bar to said elongated bar longitudinally of said elongated bar, a pair of upstanding lugs having arcuate surfaces oppositely disposed relative to said first mentioned arcuate surfaces carried by the ends of said second transverse bar cooperating with said first named lugs in clamping the jug bottom, a rubber cap on each lug to yieldably hold the jug onto said transverse bars, and spring means connecting said base plate to said elongated bar at the obtuse angle thereof for biasing said elongated bar and the parallelism of said base plate in the absence of weight on said elongated bar.

References Cited in the file of this patent
UNITED STATES PATENTS

| | | |
|---|---|---|
| 790,740 | Ocumpaugh | May 23, 1905 |
| 1,157,333 | Snell | Oct. 19, 1915 |
| 1,198,008 | Clive | Sept. 12, 1916 |
| 2,367,256 | Atkins | Jan. 16, 1945 |
| 2,511,531 | Hencke et al. | June 13, 1950 |
| 2,662,717 | Johnson | Dec. 15, 1953 |